DELTA-MODULATION COMMUNICATION SYSTEM WITH HYPERBALIC COMPANDING CHARACTERISTICS

Filed Dec. 13, 1966

INVENTORS
HISASHI KANEKO
ATSUSHI TOMOZAWA
BY
Hopgood & Calimafde
ATTORNEYS 3,496,468

DELTA-MODULATION COMMUNICATION SYSTEM WITH HYPERBOLIC COMPANDING CHARACTERISTICS

Hisashi Kaneko and Atsushi Tomozawa, Tokyo, Japan, assignors to Nippon Electric Company, Limited, Tokyo, Japan, a corporation of Japan Filed Dec. 13, 1966, Ser. No. 601,466
Claims priority, application Japan, Mar. 8, 1966, 41/14,200
Int. Cl. H04b 1/04
U.S. Cl. 325—38 2 Claims

ABSTRACT OF THE DISCLOSURE

A delta-modulation system including a transmitter having an encoder for producing a delta-modulated pulse signal in response to the instantaneous value of the information signal transmitted, is characterized by a local demodulator for feeding back to the input side of the encoder a component of the information signal contained in the pulse signal after companding the component. The demodulator includes: a multiplier circuit for receiving a portion of the delta-modulated pulse signal as one of its two input signals; a decoder for decoding the output of said multiplier circuit; a level detector for producing a voltage proportional to the amplitude level of the output of the decoder; and a voltage adder for producing the sum of the output voltage of the level detector and a predetermined bias voltage and supplying the sum to the multiplier circuit as the other of the input signals.

Figure 1:
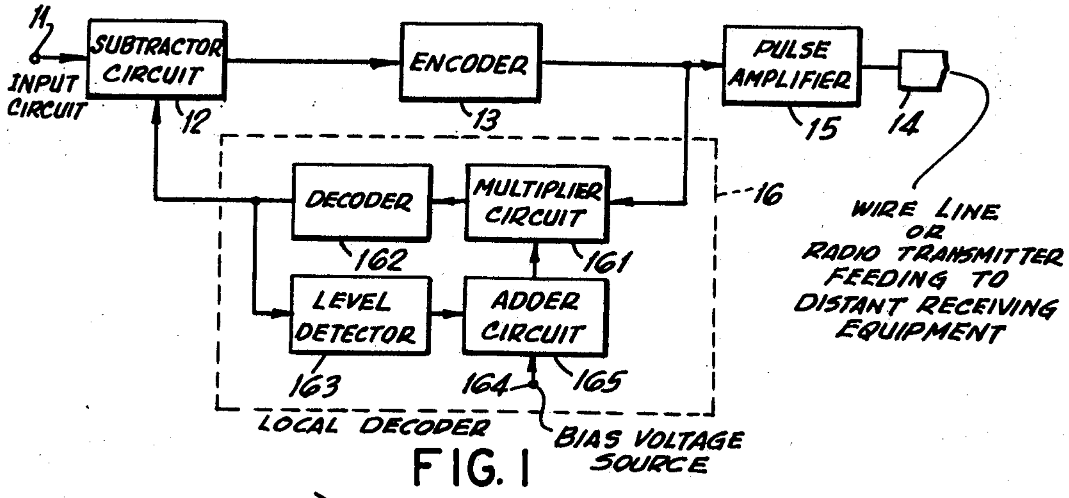

This invention relates to a delta-modulation signal transmission system and, more particularly, to a signal transmission system of the kind having what may be called hyperbolic companding characteristics.

In order to convert an analogue signal, such as a speech signal or any other information signal however complex, into a digital signal by way of a so-called delta-modulation process, a method and equipment have been used in which the varying component of the analogue signal is quantized with a constant quantizing step which is independent of the magnitude of the analogue signal, that is, the quantizing step does not depend upon whether the input analogue signal is large or small in magnitude. When resorting to this method and equipment, however, the signal-to-quantization noise ratio is inevitably lowered in response to a lowering of the amplitude of the analogue signal. Thus, any diminution of the signal amplitude necessarily distorts the analogue signal. To obviate this disadvantage, it has been proposed that the quantizing step for the small amplitude component of the signal be made smaller than the quantizing step employed for the larger signal amplitude component. For this purpose, a method and apparatus have been proposed which employ an instantaneous companding device for relatively emphasizing, i.e. enlarging, the small amplitude component of the analogue signal to be transmitted as compared with the large amplitude component of the same signal. The device may be termed an amplitude-compressor and, when used, it is positioned in a stage preceding the delta-modulator. However, this system also has serious defects, such as poor characteristics due especially to the non-uniformity of the characteristics, because the non-linearity of this instantaneous companding device depends for its operation on the inherent nonlinear characteristics of a nonlinear circuit element, such as a semiconductor device or an electronic tube.

On the other hand, an improved delta-modulated signal transmission system is described in the prior art, wherein the delta-modulator itself is made to show the nonlinear companding characteristics without resorting to the abovementioned instantaneous companding circuit. However, this also has a defect in addition to its rather complex structure. The latter system includes structure such that both the speech signal itself and a direct-current component representing the level of said speech signal are applied to the delta-modulator and then the quantizing step is nonlinearly compressed and expanded by way of increasing and decreasing said direct-current component to perform the desired companding function.

On the other hand, in a delta-modulated signal transmission system of the kind just referred to, said direct-current component may be transmitted in the form of a repetitive occurrence or sequence of the codes "1" and "−1." In other words, the probabilities of occurrence of these codes "1" and "−1" vary according to the magnitude of the speech signal level (i.e. the variations in the direct-current component of the speech signal). But in the usual communication channel for transmitting a pulse signal, the direct-current component cannot be effectively transmitted due to the presence of transformers and other reactive components incorporated in the transmission path. Due to the inability to supply to the received signal the characteristics of the portion of the signal represented by the direct-current component, the received signal cannot be reproduced at the receiver with sufficient fidelity. Hence, the arrangement of the above-noted prior art apparatus would be inadequate even if it did perform a companding quantization with companding characteristics represented by an inverse function of the companding characteristics of the transmitter side.

Therefore, an object of the present invention is to provide a delta-modulation communication system with a simple structure for obviating the various defects of the above-mentioned systems.

The delta-modulation communication system of the present invention, stated briefly, comprises: a transmitter having an encoder for generating, in the usual way, the codes "1" or "−1", hereinafter called "pulse signals," at each quantization interval in response to the variation of the instantaneous value of the low frequency analogue signal to be transmitted; and a local demodulator for nonlinearly expanding the analogue signal represented by the modulated pulse signals supplied from said encoder in such a manner that any small amplitude component may be relatively expanded as compared with the large amplitude component, the local demodulator also being arranged for negatively feeding back the expanded signal to the input terminal of said encoder; and a receiver including equipment having identical, or substantially identical, nonlinear companding quantization characteristics to correspond to those at said local demodulator for faithfully reproducing the low frequency analogue signal.

The signal transmission system of the present invention comprises a local decoder at the transmitter side and a decoder at the receiver side, both comparatively simple structures. Moreover, by suitably choosing a constant bias voltage, a stable delta-modulation operation will be performed even when the variation of the input analogue signal is extremely large as well as when the analogue signal is very small.

In the event that the signal transmission system of the present invention is used for the transmission of telephone signals, a low quantization noise channel will be effected even if the speech making up the telephone signals is not too loud, with the result that a significant improvement in communication quality is realizable. This will become more apparent from a study of this invention.

Figure 2:
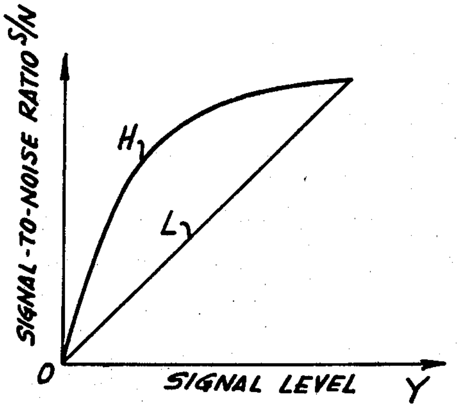
Figure 3:
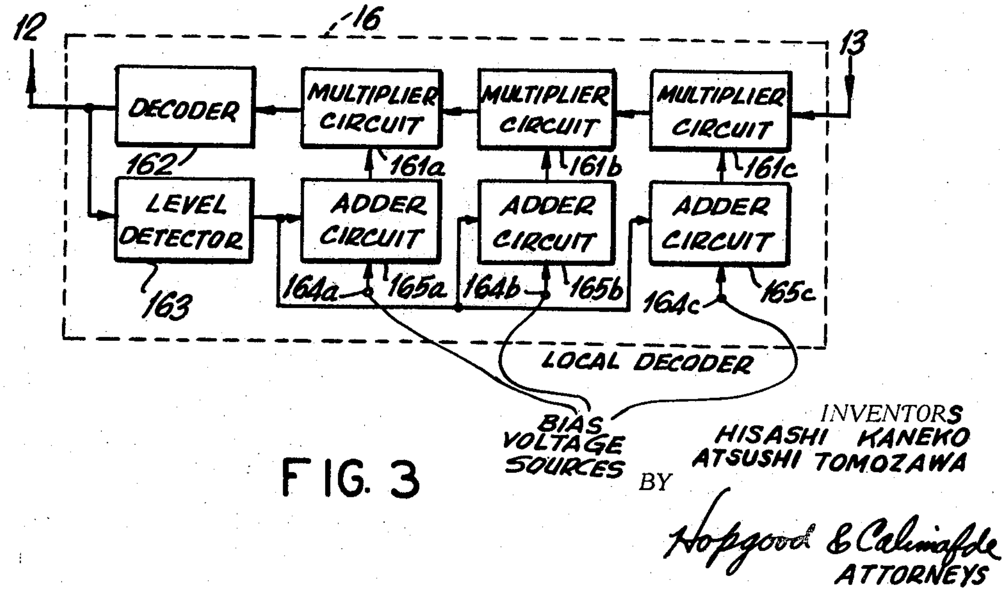

Now, the invention will be better understood from the following description with reference to the accompanying drawing, in which:

FIG. 1 represents a schematic diagram of an embodiment of the present invention;

FIG. 2 exhibits characteristic curves employed for explaining the operation of the invention; and FIG. 3 is a schematic diagram of another embodiment of the invention, which is a modification in part of the embodiment shown in FIG. 1.

Referring to FIG. 1 of the drawing, a delta-modulation transmitter representing an embodiment of the present invention comprises: an input terminal 11 for receiving from a signal source (not shown) a low frequency signal, such as a speech signal or any other information signal to be transmitted; a subtractor circuit 12 for receiving said low frequency signal from the terminal 11 as one of its two input signals; an encoder 13 which includes a signal source of pulse signals of a constant repetition frequency, such signal source generating the pulse codes "1" or "−1" depending on whether the output voltage of said subtractor circuit 12 is larger than a predetermined voltage or not, the pulse code "1" being produced when the subtractor circuit supplies an output voltage exceeding a predetermined value and the pulse code "−1" being produced when such output voltage is equal to or less than the predetermined value; a pulse amplifier 15 for amplifying the ouput of said encoder 13 and for supplying the amplified pulse to a wired or wireless transmission line shown symbolically as 14; and a local decoder or demodulator 16 for decoding a portion of the output of said encoder 13 and for supplying the decoded output to said subtractor circuit 12 as the other of the input signals to be supplied to said subtractor circuit 12. Thus, the subtractor circuit 12 will receive the low frequency signal supplied from the input terminal 11 and a portion of the encoded output of encoder 13 after it is decoded. The wired or wireless transmission line 14 may be connected or coupled—in the usual way by a wired or wireless system—to a distant receiver having companding characteristics identical, or substantially identical, to the transmitter of FIG. 1, the receiver being arranged so that it will reproduce the low frequency signal whether it is of high level or of low level.

The local decoder 16 comprises: a multiplier circuit 161 for receiving the output pulse signal as one of the two input signals; a decoder 162 for decoding the output pulse signal received from said multiplier circuit 161; a level detector 163 for producing a voltage representative of the output level of said decoder 162, or in other words, for producing a direct-current component corresponding to the level of the decoded pulse signal; a terminal 164 connected to a constant bias voltage source (not shown); and an adder circuit 165 for producing a sum corresponding to said direct-current component supplied from said level detector 163 and said bias voltage obtained from terminal 164, and for supplying said sum as the other of said two input signals to be supplied to said multiplier circuit 161.

Among the constituent elements of the FIG. 1 embodiment, it will be understood by those skilled in the art that any well-known means in this technical field may be used as the subtractor circuit 12, the encoder 13 and the pulse amplifier 15. Also, the decoder 162 may be any conventional decoding means, such as the integrator circuit used in conventional delta-modulated signal receivers. The level detector 163 may comprise a band-pass filter for receiving the ouput frequency component of the decoder 162, a rectifier for rectifying the output delivered by decoder 162, and a low-pass filter for smoothing the rectified output. The multiplier circuit 161 may comprise a switch or switching arrangement for supplying the output of the adder circuit 165 to the decoder 162 in phase or in reversed phase, depending on whether the output pulse code of the encoder 13 is coded "1" or "−1." Therefore, the multiplier 164 produces a signal representative of the product of the component supplied from the adder circuit 165 and the output pulse signal supplied from the encoder 13.

The local decoder 16, as is obvious from the above-mentioned construction, decodes, not the output signal pulse of the encoder 13 as it is, but the product of the output pulse of the encoder 13 and the sum of the direct-current component proportional to the level of the analogue signal represented by the output signal pulse of the encoder 13 and the constant bias voltage derived from source 164. The local decoder 16 then feeds back the decoded output to the subtractor circuit 12 with the result that nonlinear companding characteristics are obtained. This will now be further described.

Now, let it be assumed that the level of the analogue signal represented by the output signal pulse of the encoder 13 be X, the level of the output low frequency signal of the decoder 162 be Y, the over-all gain of the level detector 163 be A, and the bias voltage supplied to the terminal 164 be B. Then the amplitude of the signal supplied from the adder circuit 165 to the multiplier circuit 161 is given by the relation, $$M=AY+B$$

Since the output of the multiplier 161, as is mentioned above, represents the product of the output signal pulse of said encoder 13 and the output of the bias adder circuit 165, the output low frequency signal level Y is represented by the relation, $$Y=MX=X(AY+B)$$

By simple transposition, the following relation is obtained for the value of Y:

$$Y=BX/(1-AX) \quad (1)$$

From this relation, it will be understood that the output level Y, which is essentially the output level of the local decoder 16, is represented by a hyperbolic function of the input signal level X.

In other words, a hyperbolic amplitude expansion is performed on the signal level X to obtain the output level Y. Therefore, said delta-modulator is, as a whole, a delta-modulator having hyperbolic compression characteristics.

Now, the quantization noise in the delta-modulator is proportional to the magnitude of the above-mentioned quantizing step. Since the quantizing step in the system of the present invention is determined by the output voltage of the decoder 162 in the local decoder 16, the quantized noise is proportional to the input pulse amplitude supplied to the decoder 162. Therefore, the signal-to-quantization noise ratio $S/N$ is represented by the relation, $$S/N=kX \quad (2)$$

where $k$ is a constant. By solving the Equation 1 to obtain an expression for X and substituting the expression for X in the Equation 2, the signal-to-quantization noise ratio $S/N$ is represented by the relation, $$S/N=kY/(AY+B) \quad (3)$$

In FIG. 2, in which the signal level and the signal-to-noise ratio $S/N$ are plotted as the abscissae and ordinates, respectively, the relation of the Equation 3 is shown by the curve H. Curve H is a part of a hyperbola. Considering the fact that, when the demodulation characteristics of the local decoder 16 are linear, the signal-to-noise ratio characteristics corresponding to the linear decoding characteristics are also linear, as is shown by the curve L of FIG. 2. However, the substantial improvement in the signal-to-noise ratio shown by curve H will obviously be recognized. Inasmuch as the over-all gain A of the level detector circuit 163 and the bias voltage B can arbitrarily be chosen, and may therefore be made as large as desired, the improvement in the signal-to-noise ratio ($S/N$), represented by the Equation 3, may be made as large as desired.

In case the improvement in the signal-to-noise ratio is not sufficient even if the over-all gain A and the bias voltage B are varied in the above-mentioned manner, it will be apparent also that the hyperbolic characteristics of the Equation 1 may be changed to assume higher order hyperbolic characteristics.

FIG. 3 shows a modification of the FIG. 1 embodiment to achieve this same general object. The local decoder 16 which is connected between the subtractor circuit 12 and the encoder 13, as shown in FIG. 1, comprises: three bias adder circuits 165*a*, 165*b* and 165*c* instead of the bias adder circuit 165 of FIG. 1, to which the bias voltages B*a*, B*b* and B*c* are supplied from the terminals 164*a*, 164*b* and 164*c*, respectively; and multiplier circuits 161*a*, 161*b* and 161*c* instead of the multiplier circuit 161 of FIG. 1, each of which receives the output voltage supplied from each of said adder circuits, respectively. The signal-to-noise ratio $S/N$ is obtained in the same manner as the Equation 3 was obtained, yielding the expression:

$$S/N=kY/(AY+B_1)(AY+B_2)(AY+B_3) \qquad (4)$$

Therefore, it will be clearly understood that the signal-to-noise ratio can be considerably improved.

Although the invention has been described with respect to an arrangement employing apparatus for companding but one portion of a speech or other informational signal, it will be apparent that like equipments may be employed for simultaneously companding two or more portions of the same speech or other informational signal. Naturally, the same signal will be correspondingly treated at a remote receiver so that all portions of the same informational signal will be reproduced without appreciable distortion.

Although the present invention is described with respect to certain particular embodiments merely for illustrative purposes, various other modifications will be apparent to those skilled in the art. For example, a balanced modulator, of which the modulating signal is the output of the bias adder circuit 165 and the modulated signal is the pulse signal supplied from the encoder 13, or, as an alternative, a pulse-width modulator, in which the pulse width of the pulse signal supplied from the encoder 13 is modulated in response to the output of the bias adder circuit 165, may be used as the multiplier circuit 161 instead of the circuit previously described for multiplier circuit 161 which included a switch or switching arrangement responsive to the pulse codes "1" and "−1" supplied from the encoder 13 and the phase inverter. Also, though the subtractor circuit 12 is explained as means for subtracting the output voltage of the local decoder 16 from the instantaneous value of the input analogue signal supplied from terminal 11, this subtracting circuit 12 can be modified to operate as the adder circuit, because the performance of the subtraction is equivalent to an operation of algebraic summation.

While this invention has been shown and described in certain particular arrangements merely for the purpose of illustration, it will be understood that the general principles of this invention may be applied to other and widely varied organizations without departing from the spirit of the invention.

We claim:

1. A delta-modulation communication system comprising: a transmitter having an encoder for producing a delta-modulated pulse signal in response to the instantaneous value of the information signal to be transmitted; a local demodulator for feeding back to the input side of said encoder a component of said information signal contained in said delta-modulated pulse signal after companding said component, said demodulator having a multiplier circuit for receiving a portion of said delta-modulated pulse signal as one of its two input signals, decoding means for decoding the output of said multiplier circuit, the output of said decoding means forming said companded component, level detecting means coupled to the decoding means for producing a voltage proportional to the amplitude level of the output of said decoding means, and a voltage adding means for producing the sum of the output voltage of said level detecting means and a predetermined bias voltage and supplying said sum to said multiplier circuit as the other of said two input signals; and a receiver comprising a demodulator having the companding characteristics substantially identical to that of said local demodulator.

2. A claim according to claim 1 in which the multiplier circuit includes a plurality of multiplier's connected in tandem with each other, and the voltage adding means includes a corresponding plurality of adders each having a different predetermined bias voltage applied thereto and each connected to its corresponding multiplier.

References Cited

UNITED STATES PATENTS 3,249,870 5/1966 Greefkes ............ 325—38

ROBERT L. GRIFFIN, Primary Examiner

J. A. BRODSKY, Assistant Examiner

U.S. Cl. X.R.

325—42; 332—11; 333—14